United States Patent
Nortio et al.

(10) Patent No.: US 11,692,148 B2
(45) Date of Patent: Jul. 4, 2023

(54) PREPARATION OF A FUEL BLEND

(71) Applicant: Neste Oyj, Espoo (FI)

(72) Inventors: Jenni Nortio, Poroo (FI); Ulla Kiiski, Porvoo (FI); Pirjo Saikkonen, Porvoo (FI)

(73) Assignee: NESTE OYJ, Espoo (FI)

(*) Notice: Subject to any disclaimer, the term of this patent is extended or adjusted under 35 U.S.C. 154(b) by 0 days.

(21) Appl. No.: 16/765,991

(22) PCT Filed: Nov. 22, 2018

(86) PCT No.: PCT/FI2018/050849
§ 371 (c)(1),
(2) Date: May 21, 2020

(87) PCT Pub. No.: WO2019/102069
PCT Pub. Date: May 31, 2019

(65) Prior Publication Data
US 2020/0362254 A1    Nov. 19, 2020

(30) Foreign Application Priority Data

Nov. 27, 2017  (FI) ...................................... 20176062

(51) Int. Cl.
*C10G 69/14*  (2006.01)
*C10G 3/00*  (2006.01)
(Continued)

(52) U.S. Cl.
CPC .............. *C10G 69/14* (2013.01); *C10G 3/44* (2013.01); *C10G 3/50* (2013.01); *C10G 7/00* (2013.01);
(Continued)

(58) Field of Classification Search
CPC ... C10G 3/00; C10G 3/42; C10G 3/49; C10G 3/50; C10G 11/18; C10G 2300/101; C10G 69/04
See application file for complete search history.

(56) References Cited

U.S. PATENT DOCUMENTS 4,634,452 A * 1/1987 Secor ........................ C10L 1/02
                                                    44/306
5,705,722 A * 1/1998 Monnier .................. C10G 3/46
                                                    585/242
(Continued)

FOREIGN PATENT DOCUMENTS

BR  112013011287 A2  11/2016
CN      103314078 A    9/2013
(Continued)

OTHER PUBLICATIONS

International Search Report (PCT/ISA/210) dated Feb. 15, 2019, by the Finnish Patent and Registration Office as the International Searching Authority for International Application No. PCT/FI2018/050849.

(Continued)

*Primary Examiner* — Michelle Stein
(74) *Attorney, Agent, or Firm* — Buchanan Ingersoll & Rooney PC (57) ABSTRACT

A method is disclosed for preparing a renewable fuel blend. The method includes subjecting at least two feedstocks of different biological origins to catalytic cracking in a catalytic cracking unit and to hydrotreatment in a hydrotreatment unit to form a fuel blend having an aromatic hydrocarbon content from 26 to 42 wt-% and a paraffinic hydrocarbon content of less than 53 wt-%, as measured according to ASTM D2425-04 (2011). The fuel blend is formed by mixing the at least two feedstocks together before subjecting them to the catalytic cracking and hydrotreatment, or by obtaining a first fuel (Continued)

component and at least one further fuel component from the catalytic cracking and hydrotreatment of the at least two feedstocks, and mixing the first fuel component and the at least one further fuel component together.

15 Claims, 4 Drawing Sheets

(51) Int. Cl.
  *C10G 7/00* (2006.01)
  *C10G 25/02* (2006.01)
  *C10G 69/04* (2006.01)
(52) U.S. Cl.
  CPC ............ *C10G 25/02* (2013.01); *C10G 69/04* (2013.01); *C10G 2300/1007* (2013.01); *C10G 2300/1014* (2013.01); *C10G 2300/1018* (2013.01); *C10G 2300/1048* (2013.01); *C10G 2300/1081* (2013.01); *C10G 2300/304* (2013.01); *C10G 2300/307* (2013.01); *C10G 2400/04* (2013.01)

(56) References Cited

U.S. PATENT DOCUMENTS

| | | | |
|---|---|---|---|
| 9,102,888 B2 | 8/2015 | Freel et al. | |
| 9,102,889 B2 | 8/2015 | Freel et al. | |
| 9,102,890 B2 | 8/2015 | Freel et al. | |
| 9,109,177 B2 | 8/2015 | Freel et al. | |
| 9,120,988 B2 | 9/2015 | Freel et al. | |
| 9,120,989 B2 | 9/2015 | Freel et al. | |
| 9,120,990 B2 | 9/2015 | Freel et al. | |
| 9,127,223 B2 | 9/2015 | Freel et al. | |
| 9,127,224 B2 | 9/2015 | Freel et al. | |
| 9,410,091 B2 | 8/2016 | Freel et al. | |
| 9,422,485 B2 | 8/2016 | Freel et al. | |
| 9,896,390 B2 | 2/2018 | Radlein et al. | |
| 9,969,942 B2 | 5/2018 | Freel et al. | |
| 10,570,340 B2 | 2/2020 | Freel et al. | |
| 2007/0170091 A1 | 7/2007 | Monnier et al. | |
| 2009/0158637 A1* | 6/2009 | McCall | C10G 47/00 44/308 |
| 2009/0250376 A1 | 10/2009 | Brandvold et al. | |
| 2009/0294324 A1 | 12/2009 | Brandvold et al. | |
| 2009/0301930 A1 | 12/2009 | Brandvold et al. | |
| 2012/0152801 A1 | 6/2012 | Bozzano et al. | |
| 2012/0266838 A1 | 10/2012 | Gosselink et al. | |
| 2013/0145683 A1 | 6/2013 | Freel et al. | |
| 2013/0165717 A1* | 6/2013 | McCarthy | C10G 45/58 585/310 |
| 2013/0333652 A1* | 12/2013 | Trewella | C10L 1/00 585/13 |
| 2014/0135542 A1 | 5/2014 | Liang et al. | |
| 2014/0288338 A1 | 9/2014 | Radlein et al. | |
| 2015/0000186 A1 | 1/2015 | Freel et al. | |
| 2015/0004062 A1 | 1/2015 | Freel et al. | |
| 2015/0004067 A1 | 1/2015 | Freel et al. | |
| 2015/0005548 A1 | 1/2015 | Freel et al. | |
| 2015/0005549 A1 | 1/2015 | Freel et al. | |
| 2015/0059235 A1 | 3/2015 | Freel et al. | |
| 2015/0065759 A1 | 3/2015 | Freel et al. | |
| 2015/0065760 A1 | 3/2015 | Freel et al. | |
| 2015/0066731 A1 | 3/2015 | Freel et al. | |
| 2015/0068107 A1 | 3/2015 | Freel et al. | |
| 2015/0259617 A1* | 9/2015 | Sanchez | C10L 10/02 123/1 A |
| 2016/0040080 A1 | 2/2016 | Freel et al. | |
| 2016/0355739 A1 | 12/2016 | Freel et al. | |
| 2017/0306253 A1* | 10/2017 | Wrigley | C10G 7/00 |
| 2019/0078026 A1 | 3/2019 | Freel et al. | |
| 2020/0255746 A1 | 8/2020 | Freel et al. | |

FOREIGN PATENT DOCUMENTS

| | | | |
|---|---|---|---|
| CN | 106967465 A | 7/2017 | |
| EP | 2981594 B1 | 11/2017 | |
| WO | 2010039693 A2 | 4/2010 | |
| WO | WO-2011053166 A1 * | 5/2011 | ............ C10G 1/002 |
| WO | 2012062924 A1 | 5/2012 | |
| WO | WO-2014167181 A1 * | 10/2014 | ............... C07C 4/06 |
| WO | 2017114715 A1 | 7/2017 | |

OTHER PUBLICATIONS

Written Opinion (PCT/ISA/237) dated Feb. 15, 2019, by the Finnish Patent and Registration Office as the International Searching Authority for International Application No. PCT/FI2018/050849.
Finnish Search Report dated Mar. 26, 2018, issued by the Finnish Patent and Registration Office in the corresponding Finnish Application No. 20176062.
"From oil to plastics", Neste Oy, pp. 66-69, 1993. ISBN 952-9553-06-4, Frenckellin Kirjapaino Oy, Espoo.
Beckey et al., Qualitative analyses with the FI mass spectrometer, Field Ionization Mass Spectrometry, pp. 250-333.
Berzergianni, S. et al., "Hydrocracking of vacuum gas oil-vegetable oil mixtures for biofuels production", Bioresource Technology, vol. 100, pp. 3036-3042, Feb. 23, 2009.
Kuras, M. et al., "Analysis of saturated hydrocarbons by field ionization mass spectrometry", Analytical Chemistry, vol. 48, No. 1, pp. 196-198, 1976.
Stumborg, M. et al. "Hydroprocessed vegetable oils for diesel fuel Improvement", Bioresource Technology, vol. 56, pp. 13-18, Apr. 1996.
The extended European Search Report dated Nov. 30, 2020, by the European Patent Office in corresponding European Application No. 18880310.0. (7 pages).
Chinese Search Report dated Oct. 12, 2020, by the Chinese Patent Office in corresponding Chinese Application No. 2018800764098. (3 pages).
M. Al-Sabawi et al., "Fluid Catalytic Cracking of Biomass-Derived Oils and Their Blends with Petroleum Feedstocks: A Review", Energy & Fuels, Jul. 23, 2012, pp. 5355-5372, vol. 26.
M. Al-Sabawi et al., "Hydroprocessing of Biomass-Derived Oils and Their Blends with Petroleum Feedstocks: A Review", Energy & Fuels, Jun. 21, 2012, pp. 5373-5399, vol. 26.
O. Mante et al., "Fluid Catalytic Cracking of Biomass Pyrolysis Vapors", Biomass Conv. Bioref., 2011, pp. 189-201, vol. 1.
P.M. Mortensen et al., "A Review of Catalytic Upgrading of Bio-Oil to Engine Fuels", Applied Catalysis A: General, 2011, pp. 1-19, vol. 407.
M.C. Samolada et al., "Production of Bio-Gasoline by Upgrading Biomass Flash Pyrolysis Liquids Via Hydrogen Processing and Catalytic Cracking", Fuel, 1998, pp. 1667-1675, vol. 77, No. 14.
Office Action dated Mar. 10, 2021, by the Brazilian Patent Office in corresponding Brazilian Patent Application No. 112020010420.5, and an English Translation of the Office Action. (10 pages).

\* cited by examiner

PREPARATION OF A FUEL BLEND

FIELD OF THE INVENTION

The invention relates to a renewable fuel blend, and more particularly to a method for preparing the renewable fuel blend.

BACKGROUND

Fossil fuels or petroleum-based fuels may be at least partly replaced by fuels from biological sources (the so-called co-feed) including renewable feedstocks such as fats and/or oils. Several types of fuels may be obtained from these triacylglycerol-containing feedstocks. One of them is biodiesel which is defined as mono-alkyl esters of vegetable oils or animal fats. Biodiesel is produced by transesterifying the oil or fat with an alcohol such as methanol under mild conditions in the presence of a base catalyst. Another type of product that may be obtained from lipid feedstocks, is a fuel having a composition that simulates the composition of fossil diesel fuel, namely renewable diesel which is produced from the fat or oil by a hydrodeoxygenation reaction at an elevated temperature and pressure in the presence of a catalyst. The renewable diesel has a considerably higher energy content compared to biodiesel containing oxygenates, such as alcohols or esters, and is suitable for use as such in existing vehicles.

In regions with a cold climate, regular diesel fuel at fuel stations is required to meet certain cold properties. In Europe this is governed by the EN 590 standard. So-called winter diesel refers to a diesel fuel grade having enhanced cold properties, e.g. the winter grade diesel does not crystallize in cold weather conditions. The winter grade diesel is required to have excellent cold properties for operational reliability in wintertime. In Finland, the winter grade diesel fuel should be applicable e.g. at temperatures down to $-37°$ C. and storable at $-32°$ C., in comparison with e.g. an operation temperature of $-34°$ C. and storage temperature of $-29°$ C. for regular diesel fuel. A diesel grade fuel meeting even more demanding temperature requirements is called arctic grade diesel. Off-road machinery, reserve power generators in hospitals and other critical applications, and military vehicles are examples of demanding operations that require uncompromising reliability regarding performance and fuel deliveries in the toughest arctic environments. These fuels are able to withstand long-term storage at low temperatures, such as even $-40°$ C., and they are ready to provide full performance instantly when needed at temperatures such as even $-44°$ C. However, the terminology is not consistent and the requirements for the cold properties are country-specific.

A diesel grade fuel is required to fulfill certain quality criteria as set out in e.g. the EN 590 standard. The EN 590 standard refers to the properties of a hydrocarbon blend, such as cetane number, flash point, viscosity and density. It does not determine the structural entities of the fuel, such as carbon numbers of the individual hydrocarbon components. However, it can be anticipated by the required combinations of properties of the fuel composition that at least about 90% of the hydrocarbons therein have a carbon chain length, i.e. carbon number range, within C9-C30.

In petroleum industry, cloud point refers to a temperature below which wax in diesel, or biowax in biodiesels, forms a cloudy appearance, i.e. begins to solidify. The cloud point is the temperature at which the crystals of solid diesel first become visible. As the diesel starts to freeze, it forms small crystals that start agglomerating together. They become visible as cloudy diesel when they grow to four times larger than the wavelength of visible light. At this size, the crystals easily pass through filters and may be pumped and used with no problems. As the diesel gets colder, the crystals get bigger, and eventually they plug the filters. The cloud point also determines the lowest storage temperature for the fuel. A standard test method for determining the cloud point of petroleum products and liquid fuels is set out in ASTM D7689-11 (2012).

In diesel fuel blending, it is commonly known that the worst cloud point of the blending components dominates the cloud point of the fuel blend. Moreover, the cloud point cannot easily be improved by additives. A low cloud point of a diesel component or diesel fuel blend is a highly desired property. The value of diesel fuel cloud point may be determined by $US per degree (° C.) per ton depicting the importance and need for as low cloud point as possible.

Combining the excellent cold properties of a fuel with solutions combatting climate change, such as using renewable raw materials partly or totally for fuel manufacture, is highly desired for e.g. lowering traffic emissions, improving local air quality, and enhancing engine performance.

EP 2981594 B1 discloses a method for producing a hydrocarbon composition comprising steps of hydroprocessing biological feedstock(s) and fractionation.

US 2013/0333652 A1 discloses a distillate fuel having a renewable aromatic-lean component and aromatic-rich component produced from biomass and a method for using the distillate fuel. Disclosed is a composition capable of reducing a low temperature property of distillate fuel, and a process for blending the composition with a distillate fuel.

SUMMARY

According to an aspect, there is provided the subject matter of the independent claims. Embodiments are defined in the dependent claims.

One or more examples of implementations are set forth in more detail in the detailed description below. Other features will be apparent from the description and from the claims.

A diesel fuel blend with enhanced cold properties is provided. These fuel blends are readily able to replace fossil fuel in the same applications partly or totally. The obtained fuel blends originate from renewable raw materials which may include waste and/or residue material only. The fuel blends obtained have lower cloud point enabling a lower storage temperature, and also indicating a better cold filter plugging point. Moreover, the fuel blends obtained may be used for further blending.

BRIEF DESCRIPTION OF THE DRAWINGS

In the following the invention will be described in greater detail by means of preferred embodiments with reference to the attached drawing, in which.

DETAILED DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising", "containing" and "including" should be understood as not limiting the described embodiments to consist of only those features that have been mentioned and such embodiments may contain also features/structures that have not been specifically mentioned.

In oil refinery processes, cracking refers to a decomposition process induced by an elevated temperature (>350° C.), wherein higher molecular weight constituents are converted to lower molecular weight products. Cracking reactions involve carbon-carbon bond rupture. During the actual cracking process, some smaller molecules may combine to give a product of higher molecular weight.

Cracking, and especially catalytic cracking, is a process in an oil refinery used for cleaving larger hydrocarbon components into smaller short-chain hydrocarbons which are usable as traffic fuel components. Cracking is achieved by breaking the carbon-carbon bonds in the hydrocarbon chains typically in the presence of a cracking catalyst. The nature of the end products is dependent on the nature of the feed and on the process conditions under which the process is carried out, such as temperature, pressure and the nature of the catalyst.

A widely used method for carrying out catalytic cracking of high-boiling, high-molecular weight hydrocarbon fractions of petroleum crude oils is a fluid catalytic cracking process, in which a powdered catalyst is employed.

The operation of a thermofor catalytic cracker, the preheated feedstock flows by gravity through the catalytic reactor bed. The spent catalyst is regenerated, cooled, and recycled. The flue gas from regeneration may be sent for heat recovery. The catalyst may be an amorphous silica-alumina catalyst.

Thermofor catalytic cracking (TCC) refers to a moving-bed, reactor-over-generator continuous process that enables conversion or cracking of heavy feedstock into lighter fuels. The vapor-liquid feed flows downward inside the reactor concurrently with a regenerated synthetic bead catalyst. The catalyst is stripped by steam at the base of the reactor, and it gravitates into a kiln or regenerator. Approximately 70% of the carbon on the catalyst is burned in the upper kiln burning zone and the remainder in the bottom burning zone. Regenerated, cooled catalyst enters the lift pot where low-pressure air transports it to the surge hopper above the reactor for reuse.

Fluidized catalytic cracking (FCC) refers to a catalytic cracking process which uses very fine catalyst particles which are moved through the processing unit. The catalyst particles are of such a size that when aerated with steam or hydrocarbon vapor, the catalyst behaves like a liquid, and may be moved through pipes. When the heated heavy feed meets the very hot catalyst coming from the regenerator in the riser bottom, the heavy feed vaporizes and cracking reactions take place mainly in the riser. After the riser, the vapors and the catalyst are separated in cyclones. The catalyst drops to the fluidized catalyst bed where remaining oil is stripped from the catalyst by steam. The cracked vapors out of the riser enter the fractionating towers where fractionation into light- and heavy-cracked fractions takes place. Due to the contamination of the catalyst with coke, its activity is reduced, and the catalyst needs to be regenerated. Thus the separated spent catalyst flows to the regenerator where coke is removed by controlled burning. In the course of burning the coke, a large amount of heat is liberated. Most of this heat of combustion is absorbed by the regenerated catalyst, and is sufficient to vaporize the feed entering the riser.

Catalytic cracking processes including thermofor catalytic cracking (TCC), and fluidized catalytic cracking (FCC), are further discussed in a publication "From oil to plastics" (Neste Oy, ISBN 952-9553-06-4, Frenckellin Kirjapaino Oy, Espoo, 1993, p. 66-69).

A method is disclosed for preparing a renewable fuel blend. In the method, at least two feedstocks of different biological origin are subjected to catalytic cracking (e.g. TCC or FCC) in a catalytic cracking unit and to hydrotreatment in a hydrotreatment unit to obtain a fuel blend. The fuel blend has an aromatic hydrocarbon content from 26 to 42 wt-% and a paraffinic hydrocarbon content of less than 53 wt-%, as measured according to an ASTM D2425-04 (2011) standard. The blend may be formed by mixing the at least two feedstocks together before subjecting them to the catalytic cracking and hydrotreatment; or by obtaining a first fuel component and at least one further fuel component from the catalytic cracking and hydrotreatment of the at least two feedstocks, and mixing said first fuel component and said at least one further fuel component together.

Hydrocarbon fuel may be obtained from the catalytically cracked hydrocarbon after hydrotreatment.

Figure 2:
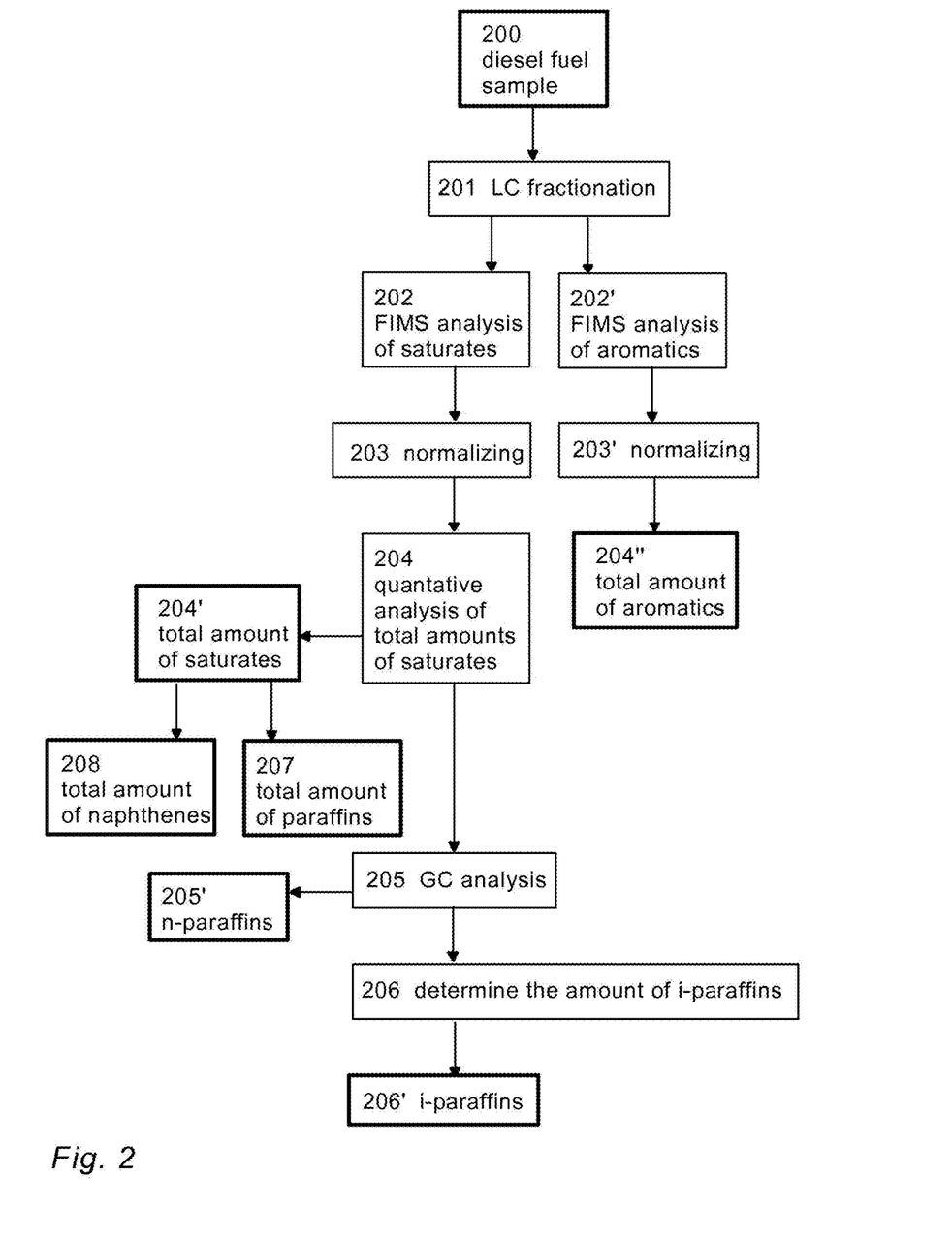
FIG. 2 illustrates an exemplary process for characterizing a fuel sample.

A fuel sample may be characterized according to the schema shown in FIG. 2. The fuel sample 200 is first fractionated 201 according to ASTM D2549-02 (2012) by liquid chromatography (LC). The obtained saturated and aromatic hydrocarbon fractions are analyzed 202, 202' separately with field ionization mass spectrometry (FIMS) according to ASTM D2425-4 (2011). The results of the fractions may be interlinked by normalizing 203, 203' the FIMS results to correspond to the percent of weight of the fractions of ASTM D2549-02 (2012). The total amount of saturates 204' (the total amount of paraffins 207 and the total amount of naphthenes 208) may be analyzed 204 from the saturated fraction, and the amount of aromatics 204" may be analysed from the aromatic hydrocarbon fraction, by using FIMS. The saturated fraction is further analyzed 205 with gas chromatography (GC) in order to detect n-paraffins 205'. Then the n-paraffins are reduced from the total amount of paraffins measured by FIMS, thus obtaining 206 the amount of i-paraffins 206'. ASTM D2425-04 (2011) is a standard method used for determining hydrocarbon types in middle distillates by mass spectrometry. ASTM D2549-02 (2012) is a standard method for separation of representative aromatics and non-aromatics fractions of high-boiling oils by elution chromatography. The FIMS method is discussed in several books and articles, e.g. in Beckey et al., Field ionization Mass Spectrometry, ISBN: 978-0-08-017557-7, pp. 250-333, or Kuras et al., Analysis of saturated hydrocarbons by field ionization mass spectrometry, Anal. Chem., 1976, 48(1), pp. 196-198. By utilizing the sequence depicted by FIG. 2, reliable and reproducible values are typically obtained.

In one embodiment of the present disclosure, 33 wt-% or more of the paraffinic hydrocarbon content of the fuel blend is i-paraffins, preferably from 33 to 40 wt-%, when measured as depicted in FIG. 2.

In one embodiment, the first fuel component is a renewable middle distillate fuel component having a distillation range from 160° C. to 370° C., preferably from 180° C. to 360° C.

In one embodiment, the further fuel component is a renewable middle distillate fuel having a distillation range from 160° C. to 370° C., preferably from 180° C. to 360° C.

In one embodiment, at least 90% of the hydrocarbons in the first fuel component, the further fuel component and the fuel blend have carbon numbers within a range from C9 to C22.

In one embodiment, the catalytic cracking comprises thermofor catalytic cracking (TCC). This method is less sensitive for varying feedstock materials.

In an embodiment, the catalytic cracking comprises fluid catalytic cracking (FCC) which is a widely used technique.

In one embodiment, the feedstock for obtaining the first fuel component comprises by-products of the wood pulp manufacture e.g. from the kraft process, such as by-products from crude tall oil or tall oil processing. Preferably, the feedstock comprises distillation products of the crude tall oil or tall oil process, more preferably non-volatile fraction that is separated at crude tall oil vacuum distillation. Most preferably, the feedstock contains tall oil pitch (TOP). In a preferred embodiment, the feedstock for the first fuel component is TOP. TOP contains an especially suitable amount of aromatic structures.

In one embodiment, the feedstock for obtaining the further fuel component comprises feeds containing glycerides or fatty acids, preferably comprising vegetable oil, animal fat, fish fat, fish oil, algae oil, microbial oil and/or wood and/or other plant based oil, or recyclable waste and/or residue thereof or any combination thereof. Recyclable waste comprises material such as used cooking oil, free fatty acids, palm oil side streams, sludge, and side steams from vegetable oil processing.

In one embodiment, the feedstock for obtaining the further fuel component comprises used cooking oil (UCO) and/or animal fat (AF) which are readily available and acknowledged waste material of biological origin.

In one embodiment, the feedstock for obtaining the further fuel component comprises vacuum gas oil (VGO) and/or used lubricating oil (ULO).

In one embodiment, the formed fuel blend contains 25-75 wt-% of the first fuel component, preferably obtained from TOP.

In one embodiment, the formed fuel blend contains 25-75 wt-% of the further fuel component, preferably obtained from UCO and/or AF.

In one embodiment, the method further comprises subjecting the first fuel component and/or the further fuel component to hydrotreatment, preferably to hydrodesulphurisation and/or hydrodeoxygenation, before mixing the first fuel component and the further fuel component together.

In one embodiment, the hydrotreatment is performed at a temperature from 200° C. to 400° C. and at a pressure from 20 to 150 bar.

In one embodiment, the method further comprises subjecting the first fuel component and/or the further fuel component to isomerization before mixing the first fuel component and the further fuel component together.

In one embodiment, the fuel blend is manufactured by using catalytic cracking, such as thermofor catalytic cracking (TCC), or fluidized catalytic cracking (FCC), for the fuel manufacture from renewable feeds. A feed comprising tall oil pitch (TOP) is provided and refined. The obtained fuel may be blended with a further renewable fuel originating from a feed comprising animal fat (AF) and/or used cooking oil (UCO). The aromatic content of the fuel blend is from 26 to 42 wt-% and the paraffinic content below 53 wt-%, wherefrom the amount of i-paraffins from the total paraffins is more than 33 wt-% (i-paraffinic/n-paraffinic ratio is from 0.49 to 0.70).

In one embodiment, the cloud point of the fuel blend is lowered compared to the cloud point of the fuel blend obtained based on the cloud points of the individual components thereof, the components being the first fuel component and the at least one further fuel component, said cloud points being measured according to the ASTM D7689-11 (2012) standard which is a standard test method for determining the cloud point of fuels.

In one embodiment, the cloud point of the fuel blend is at least 1° C. lower, preferably at least 2° C. lower, more preferably at least 3° C. lower, most preferably at least 4° C. lower, than the calculated cloud point of the mixture of the first fuel component and the at least one further fuel component. This effect is most pronounced when only two fuel components of different biological origin are mixed together.

In one embodiment, the catalyst in the catalytic cracking comprises aluminium based catalyst, lanthanum based catalyst, titanium based catalyst and/or silicon based catalyst.

In one embodiment, the temperature in the catalytic cracking is from 450° C. to 470° C., preferably from 455° C. to 465° C.

In one embodiment, the method further comprises subjecting the feedstock to pretreatment, such as selective pretreatment depending on the quality of the feedstock material and the type of impurity. Preferably feedstock comprising animal fat AF is pretreated before the catalytic cracking by at least one of adsorption, treatment with an ion exchange resin, or washing. Preferably feedstock comprising UCO is pretreated to reduce the amount of chlorides therein.

In one embodiment, the method further comprises subjecting the first and the further fuel component to fractionation by distillation for selecting a suitable or desired boiling point fraction, preferably within the selected specification.

A renewable fuel blend produced by the method is disclosed. The renewable fuel blend comprises from 25 to 75 wt-% of the first fuel component of biological origin, preferably from catalytically cracked tall oil pitch, and from 25 to 75 wt-% of the further fuel component originating from biological origin different from that of the first fuel component, preferably catalytically cracked used cooking oil and/or animal fat. The aromatic hydrocarbon content of said blend is from 26 to 42 wt-%, and the paraffinic hydrocarbon content of said blend is from 31 to 53 wt-%, such that 33 wt-% or more of the paraffinic hydrocarbon content is i-paraffins, as measured according to ASTM D2425-4 (2011), and as explained and illustrated by FIG. 2.

In an embodiment, the cloud point of the produced renewable fuel blend is lower than the cloud point calculated for the blend using the cloud points of the individual components, as measured according to the ASTM D7689-11 (2012) standard. The individual components therein comprise the first fuel component originating from catalytically cracked and hydrotreated tall oil pitch and the further fuel component(s) originating from catalytically cracked used cooking oil and/or animal fat.

The fuel blend thus obtained has a better i.e. lower cloud point by approximately 20-30%, e.g. by 2-4° C., than the anticipated cloud point derived from the cloud points of the individual fuel components. The renewable fuel blend may be further blended with fossil diesel fuel.

In an embodiment, the renewable fuel blend may be used for decreasing the cloud point of a fuel composition comprising fossil fuel. The aromatic hydrocarbon content of such a fuel blend is at least 26 wt-%, and the paraffinic hydrocarbon content of the fuel blend is less than 53 wt-%, as measured according to the ASTM D2425-04 (2011) standard, provided that 33 wt-% or more of the paraffinic hydrocarbon content of the fuel blend is i-paraffins. The fuel blend may thus contain from 25 to 75 wt-% of the fuel component obtained from tall oil pitch, and/or from 25 to 75 wt-% of further fuel component obtained from used cooking oil and/or animal fat.

The present invention relates to a process for producing a renewable fuel blend. The renewable fuel blend is a hydrocarbon fuel blend that may be used as such or for fossil diesel fuel blending. The renewable fuel blend may be used as a component when producing a diesel fuel meeting the quality requirements for fossil diesel fuel, such as the EN 590 standard. Renewable fuel refers to a biomass-derived fuel oil, a fuel oil prepared from the conversion of biomass. Herein fuel refers to transportation fuels which are fractions or cuts of hydrocarbons, and preferably have a distillation range (boiling point range) typical for regular diesel fuel (e.g. 160-370° C.).

Renewable feedstock of biological origin is utilized in the process. Tall oil pitch (TOP) is used as the preferred feedstock, together with at least one further feedstock such as, for example, animal fat, and/or used cooking oil. TOP is a nonvolatile fraction that is obtained in crude tall oil vacuum distillation. Tall oil is lignocellulosic raw material oil obtained as a by-product from a pulp process of wood material. It comprises a varying mixture of resin acids, fatty acids, neutral materials, i.e. mainly sterols, and esters of these alcohols and acids. Tall oil is generally refined by distillation at a low pressure. Primary oil, fatty acids and resin acids are recovered as overhead of the distillation, and TOP is generated as a distillation residue.

TOP comprises in itself alcohol esters of fatty and resin acids, oligomers of fatty and resin acids, phytosterols, high-boiling neutral matters such as spirits, hydrocarbons, etc. The use of TOP is limited, firstly by its high viscosity (3000 cP/50° C.), and secondly, by the fact that TOP is seldom totally in solid form. Consequently, it is used in flaming torches and outdoor fire pots and similar applications. Additionally it is used as a binder in cement, an adhesive, and an emulsifier for asphalt.

In the present method, TOP is combined with AF and/or UCO either by introducing them jointly to the catalytic cracking unit, or TOP is fed in a mixed feed stream or as a separate feed stream either before, after or before and after the introduction of AF and/or UCO.

Figure 1A:
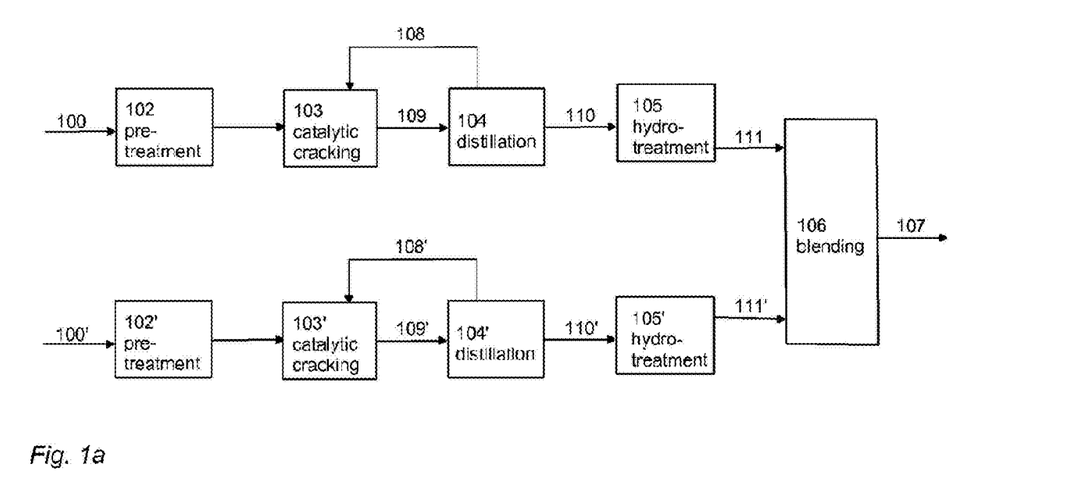
FIGS. 1a and 1b illustrate exemplary processes for preparation of a fuel blend.
Figure 1B:
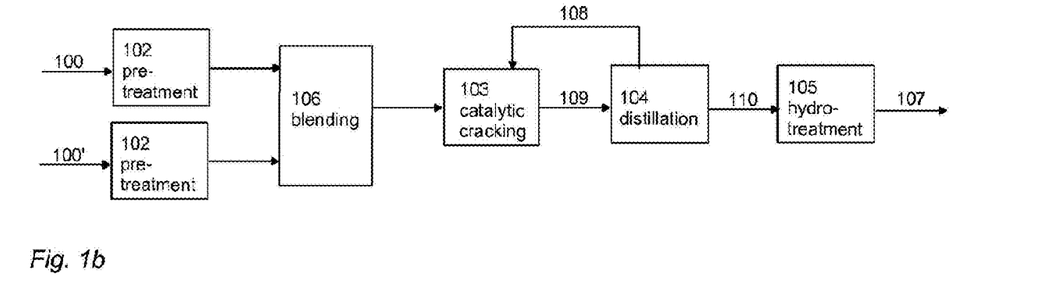

FIGS. 1a and 1b show embodiments of the process for producing a renewable fuel blend.

In FIG. 1a, a first feedstock stream 100 comprising TOP is fed to a catalytic cracking unit 103 where the feedstock is cracked. Before the catalytic cracking, the feedstock may be subjected to pretreatment 102 e.g. by adsorption, treatment with an ion exchange resin, and/or washing. The catalytic cracking unit 103 may be a TCC unit or FCC unit containing a catalyst (e.g. amorphous aluminum silicate). The temperature used to perform the catalytic cracking is from 450° C. to 470° C., preferably from 455° C. to 465° C. Optionally, spent catalyst may be recycled through catalyst regeneration, and regenerated catalyst may be fed back to the catalytic cracking unit 103 (not shown in FIG. 1a). The cracking product stream 109 is fed to a distillation column 104 for fractionation, wherein fractions are directed to a distillation bottom recycle stream 108, or recovered as a distillation product stream 110. The distillation product stream 110 is further fed to a hydrotreatment unit 105 to subject the stream 110 to e.g. hydrodesulphurisation, isomerization, and/or hydrodeoxygenation. The hydrotreatment may be performed at a temperature from 200° C. to 400° C., and/or at a pressure of 20 to 150 bar. A first fuel component 111 is thus obtained. A further feedstock stream 100' comprising AF or UCO or a mixture thereof, is fed to a catalytic cracking unit 103' where the feedstock is cracked (before the catalytic cracking, the feedstock may be subjected to pretreatment 102' e.g. by adsorption, treatment with an ion exchange resin, and/or washing), and subsequently experiences process steps 104'-110' which correspond to process steps 104-110 experienced by the first feedstock 100 respectively according to FIG. 1a. A further fuel component 111' is thus obtained. The first fuel component 111 is mixed with the further fuel component 111' in a blending unit 106 (renewable component pool 106) to form a fuel blend 107 which has an aromatic hydrocarbon content from 26 to 42 wt-% and a paraffinic hydrocarbon content of less than 53 wt-%, as measured according to the schema depicted in FIG. 2. The formed fuel blend 107 may contain from 25 to 75 wt-% of fuel component originating from tall oil pitch, and from 25 to 75 wt-% of fuel component originating from used cooking oil and/or animal fat. The formed fuel blend 107 may be further blended with fossil fuel (not shown in FIG. 1a).

In FIG. 1b, a first feedstock stream 100 comprising TOP and a further feedstock stream 100' comprising AF, UCO, ULO, VGO or any mixture thereof, are fed to a catalytic cracking unit 103 where the feedstock mixture 101 is cracked. Before the catalytic cracking, the different feedstocks 100, 100' may be subjected to pretreatment 102 e.g. by adsorption, treatment with an ion exchange resin, and/or washing, after which they are mixed in a blending unit 106 (renewable component pool 106) to form the feedstock mixture 101 to be fed to the catalytic cracking. The catalytic cracking unit 103 may be a TCC unit or FCC unit containing a catalyst (e.g. amorphous aluminium silicate). The temperature used to perform the catalytic cracking is from 450° C. to 470° C., preferably from 455° C. to 465° C. Optionally, spent catalyst may be recycled through catalyst regeneration, and regenerated catalyst may be fed back to the catalytic cracking unit 103 (not shown in FIG. 1b). The cracking product stream 109 is fed to a distillation column 104 for fractionation, wherein fractions are directed to a distillation bottom recycle stream 108, or recovered as a distillation product stream 110. The distillation product stream 110 is further fed to a hydrotreatment unit 105 to subject the stream 110 to e.g. hydrodesulphurisation, isomerization, and/or hydrodeoxygenation. The hydrotreatment may be performed at a temperature from 200° C. to 400° C., and/or at a pressure of 20 to 150 bar, to obtain the fuel blend 107 which has an aromatic hydrocarbon content from 26 to 42 wt-% and a paraffinic hydrocarbon content of less than 53 wt-%, as measured according to the schema depicted in FIG. 2. The formed fuel blend 107 may contain from 25 to 75 wt-% of fuel component obtained from tall oil pitch, and from 25 to 75 wt-% of fuel component obtained from used cooking oil and/or animal fat. Also a fossil fuel component may be mixed with the renewable feedstocks in the blending unit 106 (renewable component pool 106) before the catalytic cracking 103 (or after the hydrotreatment 105 (not shown in FIG. 1b)).

The invention is further illustrated by the following non-limiting examples.

Comparative Example 1

Two mineral diesel blends having different cloud points were blended. The cloud points of the blends were measured by a method defined in EN 23015. Measured cloud point values (Y-axis) for mineral diesel blends (X-axis) are presented in Table 1 and FIG. 3, respectively. The calculated linear values in Table 1 are based on linear behaviour which means a weighted mean of cloud points of the components. The linear behaviour is an average of the cloud points, and it is in other words accomplished by weighting the cloud points of components by the volume percent of components in the blend. Analysis shows that the poorer cloud point component dominates.

TABLE 1

Cloud points of mineral diesel blends

| Volume percent (%) of diesel with cloud point −27.8° C. | Volume percent (%) of diesel with cloud point −4.3° C. | Cloud point of blend (° C.) (measured) | Cloud point of blend (° C.) (calculated linear) |
|---|---|---|---|
| 80% | 20% | −18.8 | −23.1 |
| 60% | 40% | −13.3 | −18.4 |
| 40% | 60% | −9.5 | −13.7 |
| 20% | 80% | −6.4 | −9.0 |

Figure 3:
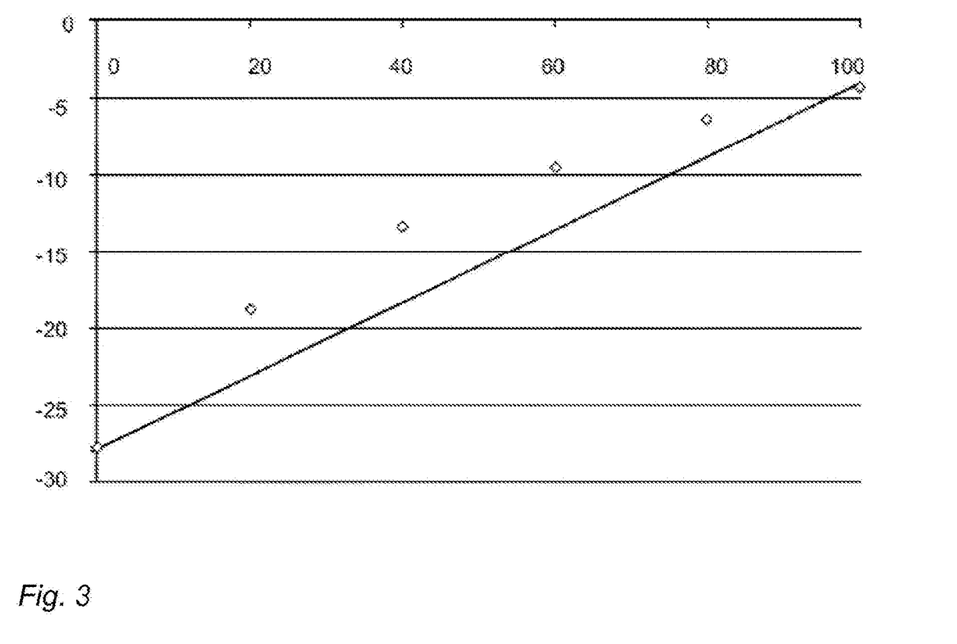
FIG. 3 illustrates cloud point behaviour of mineral diesel fuel blends.

FIG. 3 shows that components with poorer cloud point values dominated in the mineral diesel blends. The term "poorer" means a higher temperature value of a cloud point, and the term "better" means a lower temperature value of a cloud point.

Example 2

Table 2 shows properties determined for TOP, AF and UCO based fuels or fuel components, by using various test methods.

TABLE 2

Properties of TOP, AF and UCO based fuels

| | Test method | TOP | AF | UCO |
|---|---|---|---|---|
| Distillation range (° C.) | ASTM D7349 | 178.4-361.9 | 171.5-345.4 | 161.9-349.9 |
| Carbon number range (90% of the composition) | ASTM D7349 | C9-C22 | C9-C22 | C9-C22 |
| Dist. 95% (° C.) | ASTM D7349 | 348.2 | 318.5 | 321.8 |
| Cloud point (° C.) | ASTM D7689-11 (2012) | −11.3 | −5.9 | −14.6 |
| Cetane number | ASTM D6890 | 36.2 | 64.1 | 57.2 |
| Density (kg/m$^3$) | ENISO 12185 | 881.4 | 810.4 | 824.8 |
| n-paraffins (wt-%) | as described above, FIG. 2 | 13.0 | 43.7 | 31.8 |
| i-paraffins (wt-%) | as described above, FIG. 2 | 12.7 | 17.8 | 17.0 |
| Naphthenes (wt-%) | as described above, FIG. 2 | 28.4 | 18.8 | 236 |
| Aromatics (wt-%) | as described above, FIG. 2 | 45.9 | 19.7 | 27.6 |

Example 3

Fuel blends were prepared according to the schema depicted in FIG. 1a. The tall oil pitch (TOP) feed used in the experiments was analysed to comprise the properties as depicted in Table 3, the animal fat (AF) feed used in the experiments was analysed to comprise the properties as depicted in Table 4, and the used cooking oil (UCO) feed used in the experiments was analysed to comprise the properties as depicted in Table 5. The TCC reactor was operated at 460° C. under atmospheric pressure with WHSV set to 0.3 l/h. The reactor was filled with TCC catalyst (silicon-aluminium oxide, 3-5 mm) using glass beads on top and quartz sand underneath the catalyst bed. The obtained product was distilled to obtain a diesel (160-370° C.) fraction using batch distillers and a thin film distillation unit, and hydrotreated.

TABLE 3

TOP analysis results

| Property | Unit | Value |
|---|---|---|
| Viscosity 80° C. | mm$^2$/s | 87.2 |
| Viscosity 100° C. | mm$^2$/s | 39.48 |
| Water | mg/kg | 716 |
| Density 60° C. | kg/m$^3$ | 950.3 |
| Flash point | ° C. | >250 |
| Bromine number | g Br/l00 g | 67 |
| Nitrogen | mg/kg | 590 |
| Carbon | wt-% | 80.5 |
| Hydrogen | wt-% | 11 |
| Arsenic | mg/kg | 0.083 |
| Resin acids | wt-% | 14.2 |
| Sulphate | mg/kg | 9500 |
| Formic acid | mg/kg | 15 |
| Acetic acid | mg/kg | 9 |
| Propionic acid | mg/kg | 14 |
| Molybdenum | mg/kg | <0.3 |
| Sulphur | mg/kg | 2770 |
| Cadmium | mg/kg | <0.5 |
| Organic chlorides | mg/kg | 3 |
| Free fatty acids C18:1 | wt-% | 31.3 |
| Solids | wt-% | 4.72 |
| Aluminium | mg/kg | 9.1 |
| Chrome | mg/kg | 0.3 |
| Copper | mg/kg | <0.1 |
| Iron | mg/kg | 12.1 |
| Sodium | mg/kg | 300 |
| Nickel | mg/kg | <0.5 |
| Lead | mg/kg | <0.6 |
| Silicon | mg/kg | 29.7 |
| Tin | mg/kg | <1 |
| Vanadium | mg/kg | 0.3 |
| Barium | mg/kg | 0.3 |
| Calcium | mg/kg | 18 |
| Magnesium | mg/kg | 3 |
| Manganese | mg/kg | 3.5 |
| Phosphorus | mg/kg | 60.1 |
| Zinc | mg/kg | 1.3 |
| Total acid number (TAN) | mg KOH/g | 62 |
| Iodine number | | 137 |
| Chlorine | mg/kg | <10 |

TABLE 4

AF analysis results

| Property | Unit | Value |
|---|---|---|
| Density 15° C. | kg/m$^3$ | 913.8 |
| Flash point | ° C. | >230.0 |
| Carbon | wt-% | 76.9 |
| Hydrogen | wt-% | 11.9 |
| Nitrogen | wt-% | <0.2 |
| Arsenic | mg/kg | <0.10 |
| Sulphur | mg/kg | 32.2 |
| Organic chlorides | mg/kg | 5 |
| Potassium | mg/kg | 19 |
| Aluminium | mg/kg | <0.3 |
| Iron | mg/kg | 3.8 |
| Sodium | mg/kg | 14 |
| Nickel | mg/kg | <0.5 |
| Lead | mg/kg | <0.6 |
| Silicon | mg/kg | 0.76 |
| Vanadium | mg/kg | <0.3 |

TABLE 4-continued

AF analysis results

| Property | Unit | Value |
|---|---|---|
| Calcium | mg/kg | 11 |
| Magnesium | mg/kg | 1.2 |
| Phosphorus | mg/kg | 24 |
| TAN | mg KOH/g | 11 |

TABLE 5

UCO analysis results

| Property | Unit | Value |
|---|---|---|
| Viscosity 90° C. | mm$^2$/s | 10.53 |
| Nitrogen | mg/kg | 50 |
| Polyethylene | wt-ppm | <10 |
| Melt point | ° C. | <30.0 |
| Monoglycerides | area-% | 0.3 |
| Diglycerides | area-% | 7.2 |
| Triglycerides | area-% | 83.8 |
| Oligomers | area-% | 6.6 |
| Fatty acids | area-% | 2.1 |
| Sulphur | mg/kg | 9 |
| Base nitrogen mg N/kg | | 6 |
| Chlorides | mg/kg | 49 |
| Phosphates | mg/kg | 19 |
| Organic chlorides | mg/kg | 39 |
| Chlorine | mg/kg | 55 |
| Solids | wt-% | 0.07 |
| Aluminium | mg/kg | 0.3 |
| Chrome | mg/kg | <0.3 |
| Copper | mg/kg | <0.1 |
| Iron | mg/kg | 1.6 |
| Sodium | mg/kg | 5.1 |
| Nickel | mg/kg | <0.5 |
| Lead | mg/kg | <0.6 |
| Silicon | mg/kg | 0.4 |
| Vanadium | mg/kg | <0.3 |
| Barium | mg/kg | <0.3 |
| Calcium | mg/kg | 0.4 |
| Magnesium | mg/kg | <0.3 |
| Manganese | mg/kg | <0.3 |
| Phosphorus | mg/kg | 3.2 |
| Total acid number (TAN) | mg KOH/g | 4.6 |
| Iodine number | | 96 |
| Density 50° C. | kg/m$^3$ | 898.6 |

The prepared fuel blends were characterized according the schema depicted in FIG. 2, wherein samples of the fuel blends were fractionated and analyzed accordingly. Table 6 and Table 7 show the properties determined for the fuel blends formed of TOP, AF and/or UCO based fuels; "cloud point" is the measured cloud point of the blend, "calculated" is the anticipated mathematical cloud point value (weighted mean value) for the fuel blend based on the cloud point values of the different fuel components and their portions, "difference" is the difference between the measured and calculated cloud point values.

As can be seen from Table 6 and Table 7, the desired decrease in the cloud point of the fuel blend was observed with fuel blends containing TOP-based fuel component and at least one of AF-based and/or UCO-based fuel component. The observed decrease in the cloud point thus indicates that the fuel blends containing TOP-based fuel component and at least one of AF-based and/or UCO-based fuel component have enhanced cold properties e.g. regarding operational reliability and storability.

TABLE 6

Properties of AF/TOP/UCO blends (with 3 feedstocks)

| AF TOP UCO blends | cloud point (° C.) | calculated (° C.) | difference (° C.) | naftenes (wt-%) | n-paraf. (wt-%) | i-paraf. (wt-%) | aromatics (wt-%) |
|---|---|---|---|---|---|---|---|
| AF 25 wt-%; UCO 25 wt-%; TOP 50 wt-% | −14.3 | −10.8 | −3.5 | 24.80 | 25.35 | 15.07 | 34.78 |
| AF 50 wt-%; UCO 25 wt-%; TOP 25 wt-% | −11.6 | −9.4 | −2.2 | 22.41 | 33.03 | 16.33 | 28.23 |
| AF 25 wt-%; UCO 50 wt-%; TOP 25 wt-% | −13.8 | −11.6 | −2.2 | 23.61 | 30.06 | 16.13 | 30.20 |

TABLE 7

Properties of AF/TOP/UCO blends (with 2 feedstocks)

| AF TOP UCO blends | cloud point (° C.) | calculated (° C.) | difference (° C.) | naftenes (wt-%) | n-paraf. (wt-%) | i-paraf. (wt-%) | aromatics (wt-%) |
|---|---|---|---|---|---|---|---|
| UCO 50 wt-%; TOP 50 wt-% | −15.7 | −12.9 | −2.8 | 26.00 | 22.38 | 14.87 | 36.75 |
| TOP 50 wt-%; AF 50 wt-% | −12.9 | −8.6 | −4.3 | 23.61 | 28.32 | 15.27 | 32.80 |

Examples presented in Tables 6 and 7 show that the cloud point difference in the fuel blends is from 2.2° C. to 4.3° C. lower than the calculated cloud point obtained by the weighted mean cloud point of their components. This was surprising as it is generally recognized that poorer cloud point components are dominating in diesel fuel blending. The lowered cloud point values obtained according to the examples would give economic benefit in fuel blending in the refineries by alleviating the poorer component effect. The economic benefit from a cloud point lowered by one degree (° C.) may directly be expressed in 1 USD/ton. The TOP based component with a further component based on either UCO or AF is shown to give blend cloud points which are clearly better (i.e. lower) than anticipated blend cloud points of the individual components. The lower cloud point means better cold storage stability, and moreover, indicate lower cold filter plugging point (CFPP), wherein CFPP correlates with the vehicle cold operability in low temperatures.

It will be obvious to a person skilled in the art that, as the technology advances, the inventive concept can be implemented in various ways. The invention and its embodiments are not limited to the examples described above but may vary within the scope of the claims.

The invention claimed is:

1. A method for preparing a renewable diesel fuel blend, the method comprising:
    subjecting at least two different feedstocks of renewable biological origin, the at least two different feedstocks including a feedstock for obtaining a first fuel component and a feedstock for obtaining a further fuel component, to catalytic cracking in a catalytic cracking unit and to hydrotreatment in a hydrotreatment unit to form a renewable diesel fuel blend having an aromatic hydrocarbon content from 26 to 42 wt-% and a paraffinic hydrocarbon content of less than 53 wt-%, as measured according to ASTM D2425-04 (2011);

wherein the feedstock for obtaining the first fuel component of the renewable diesel fuel blend is tall oil pitch (TOP), and the feedstock for obtaining the further fuel component of the renewable diesel fuel blend includes at least one of used cooking oil (UCO) and animal fat (AF), wherein the formed renewable diesel fuel blend contains 25-75 wt-% first fuel component obtained from tall oil pitch (TOP), and 25-75 wt-% further fuel component obtained from at least one of used cooking oil (UCO) and animal fat (AF), wherein the renewable diesel fuel blend is formed by:
obtaining the first fuel component and the further fuel component from the catalytic cracking and hydrotreatment of the at least two feedstocks, and mixing said first fuel component and said further fuel component together; and wherein a measured cloud point of the renewable diesel fuel blend is lower than a calculated cloud point of the fuel blend as a weighted mean of measured cloud points of individual components thereof, the individual components being the first fuel component and the at least one further fuel component, wherein the measured cloud points are measured according to ASTM D7689-11 (2012).

2. The method according to claim 1, wherein 33 wt-% or more of the paraffinic hydrocarbon content of the renewable diesel fuel blend is i-paraffins.

3. The method according to claim 1, wherein at least one of a first fuel component or at least one further fuel component of the renewable diesel fuel blend is a renewable middle distillate fuel component having a distillation range from 160° C. to 370° C.

4. The method as claimed in claim 1, wherein the catalytic cracking comprises:
thermofor catalytic cracking (TCC).

5. The method as claimed in claim 1, wherein the hydrotreatment is performed at a temperature from 200° C. to 400° C. and at a pressure from 20 bar to 150 bar in a presence of a hydrotreatment catalyst.

6. The method as claimed in claim 1, wherein the method comprises:
subjecting at least one of a first fuel component or a further fuel component to isomerization.

7. The method as claimed in claim 1, wherein the catalyst in the catalytic cracking includes at least one of aluminium based catalyst, lanthanum based catalyst, titanium based catalyst or silicon based catalyst.

8. The method as claimed in claim 1, wherein the temperature in the catalytic cracking is from 450° C. to 470° C.

9. The method as claimed in claim 1, wherein the method comprises:
subjecting the feedstock having animal fat to pretreatment before the catalytic cracking by at least one of adsorption, treatment with an ion exchange resin, or washing.

10. The method as claimed in claim 1, wherein the method comprises:
subjecting a first and a further fuel component to fractionation by distillation.

11. The method according to claim 1, wherein 33 to 40 wt-% or more of the paraffinic hydrocarbon content of the renewable diesel fuel blend is i-paraffins.

12. The method according to claim 2, wherein at least one of a first fuel component or at least one further fuel component of the renewable diesel fuel blend is a renewable middle distillate fuel component having a distillation range from 180° C. to 360° C.

13. The method as claimed in claim 1, wherein the temperature in the catalytic cracking is from 455° C. to 465° C.

14. The method as claimed in claim 1, wherein the renewable diesel fuel blend has a cloud point that is lowered by approximately 20-30% than the cloud points of the individual fuel components.

15. A method for preparing a renewable diesel fuel blend, the method comprising:
subjecting at least two different feedstocks of renewable biological origin, the at least two different feedstocks including a feedstock for obtaining a first fuel component and a feedstock for obtaining a further fuel component, to catalytic cracking in a catalytic cracking unit and to hydrotreatment in a hydrotreatment unit to form a renewable diesel fuel blend having an aromatic hydrocarbon content from 26 to 42 wt-% and a paraffinic hydrocarbon content of less than 53 wt-%, as measured according to ASTM D2425-04 (2011);

wherein the feedstock for obtaining the first fuel component of the renewable diesel fuel blend is tall oil pitch (TOP), and the feedstock for obtaining the further fuel component of the renewable diesel fuel blend includes at least one of used cooking oil (UCO) and animal fat (AF), wherein the formed renewable diesel fuel blend contains 25-75 wt-% first fuel component obtained from tall oil pitch (TOP), and 25-75 wt-% further fuel component obtained from at least one of used cooking oil (UCO) and animal fat (AF), wherein the renewable diesel fuel blend is formed by:
mixing the at least two feedstocks together before subjecting them to the catalytic cracking and hydrotreatment; and wherein a measured cloud point of the renewable diesel fuel blend is lower than a calculated cloud point of the fuel blend as a weighted mean of measured cloud points of individual components thereof, the individual components being the first fuel component and the at least one further fuel component, wherein the measured cloud points are measured according to ASTM D7689-11 (2012).

* * * * *